(12) United States Patent
MacKenzie

(10) Patent No.: US 8,281,517 B2
(45) Date of Patent: Oct. 9, 2012

(54) WALL PLANTING SYSTEM

(75) Inventor: David S. MacKenzie, Nunica, MI (US)

(73) Assignee: Hortech, Inc., Nunica, MI (US)

( * ) Notice: Subject to any disclaimer, the term of this patent is extended or adjusted under 35 U.S.C. 154(b) by 141 days.

(21) Appl. No.: 12/700,786

(22) Filed: Feb. 5, 2010

(65) Prior Publication Data
US 2011/0192084 A1    Aug. 11, 2011

(51) Int. Cl.
*A01G 9/02* (2006.01)

(52) U.S. Cl. .................................. 47/83; 47/82

(58) Field of Classification Search ................ 47/83, 79, 47/59 R, 62 R, 62 A, 62 C, 39, 41.01, 82
See application file for complete search history.

(56) References Cited

U.S. PATENT DOCUMENTS

| | | | |
|---|---|---|---|
| 4,255,896 A * | 3/1981 | Carl ............................... | 47/62 C |
| 4,334,386 A * | 6/1982 | Burcombe et al. ............ | 47/62 E |
| 4,347,687 A * | 9/1982 | Sibbel ............................... | 47/79 |
| 5,095,649 A * | 3/1992 | Brownlee ..................... | 47/41.01 |
| 7,627,983 B1 | 12/2009 | Deutsch-Aboulmahassine | |
| 2009/0260282 A1 * | 10/2009 | Hashimoto et al. ............ | 47/20.1 |

\* cited by examiner

*Primary Examiner* — Kristen C Hayes
(74) *Attorney, Agent, or Firm* — Price Heneveld LLP

(57) ABSTRACT

A modular wall planting system includes at least a pair of planting units each comprising a mounting structure mountable to a vertical wall surface, and a trough extending outwardly from the mounting structure and including an upwardly opening aperture, the trough defining an interior compartment divided into a first section and a second section at least partially divided from the first section, wherein the first section is adapted to receive plant matter therein, the second section is adapted to receive fluid drained from the first section, and wherein the trough includes at least one weep aperture adapted to allow water to drain from the interior compartment and the second section to an exterior of the trough. The system further comprises a fluid line extending into the interior of the trough and adapted to transport a fluid thereto, wherein the individual planting units are adapted to be secured to a wall structure in at least a partially vertically aligned manner such that a lower planting unit of the pair of planting units receives fluid drained from the interior of a higher planting unit via the at least one weep aperture of the trough.

23 Claims, 5 Drawing Sheets

WALL PLANTING SYSTEM

BACKGROUND OF THE INVENTION

The present invention relates to a planting system, and in particular to a modular wall planting system that is adapted to secure to a vertical surface of a wall or a building structure.

SUMMARY OF THE INVENTION

One aspect of the present invention is to provide a planter unit for a modular wall planting system comprising a mounting portion adapted to mount to an outer surface of a substantially vertical wall structure, and a receptacle portion extending outwardly from the mounting portion and including a plurality of sidewalls and a bottom wall that cooperate to form a first compartment adapted to receive plant matter therein, and wherein the plurality of sidewalls cooperate to form an upwardly opening aperture adapted to allow plant matter to extend therethrough. The receptacle portion further includes a divider cooperating with the sidewalls and the bottom wall to define a second compartment positioned substantially below the first compartment and including at least one drain aperture extending therethrough and providing fluid communication between the first compartment and the second compartment, wherein the bottom wall includes at least one weep aperture extending therethrough and adapted to allow fluid to flow from the second compartment to an exterior of the receptacle, and wherein the plurality of sidewalls include an input aperture and an output aperture for receiving fluid flow therethrough.

Another aspect of the present invention is to provide a modular wall planting system that comprises at least a pair of planting units, each planting unit comprising a mounting structure mountable to a substantially vertical surface of a wall structure, and a trough extending outwardly from the mounting structure and including an upwardly opening aperture, wherein the trough defines an interior compartment divided into a first and a second section at least partially divided from the first section. The first section of the trough is adapted to receive plant matter therein, and the second section is adapted to receive the fluid drained from the first section, wherein the trough includes at least one weep aperture adapted to allow water to drain from the interior compartment and the second section to an exterior of the trough. The modular wall planting system further comprises a fluid line extending into the interior of the trough and adapted to transport a fluid thereto. The individual planting units are adapted to be secured to a wall structure in at least a partially vertically aligned manner such that a lower planting unit of the pair of planting units receives fluid drained from the interior of a higher planting unit via the at least one weep aperture of the trough.

The present inventive modular wall planting system allows plant matter to be secured to vertical and substantially vertical surfaces of wall structures of freestanding walls and buildings, thereby increasing the aesthetic appearance of the structure as well as improving the thermal efficiency of associated buildings. Further, the wall planting system provides a durable outer surface to the structure to which it is attached, and includes a relatively uncomplicated design that can be installed and maintained by relatively unskilled personnel. The present inventive planting system is efficient to use, capable of a long operating life, and is particularly well adapted for the proposed use.

These and other advantages of the invention will further be understood and appreciated by those skilled in the art by reference to the following written specification, claims and appended drawings.

DETAILED DESCRIPTION OF THE PREFERRED EMBODIMENTS

Figure 1:
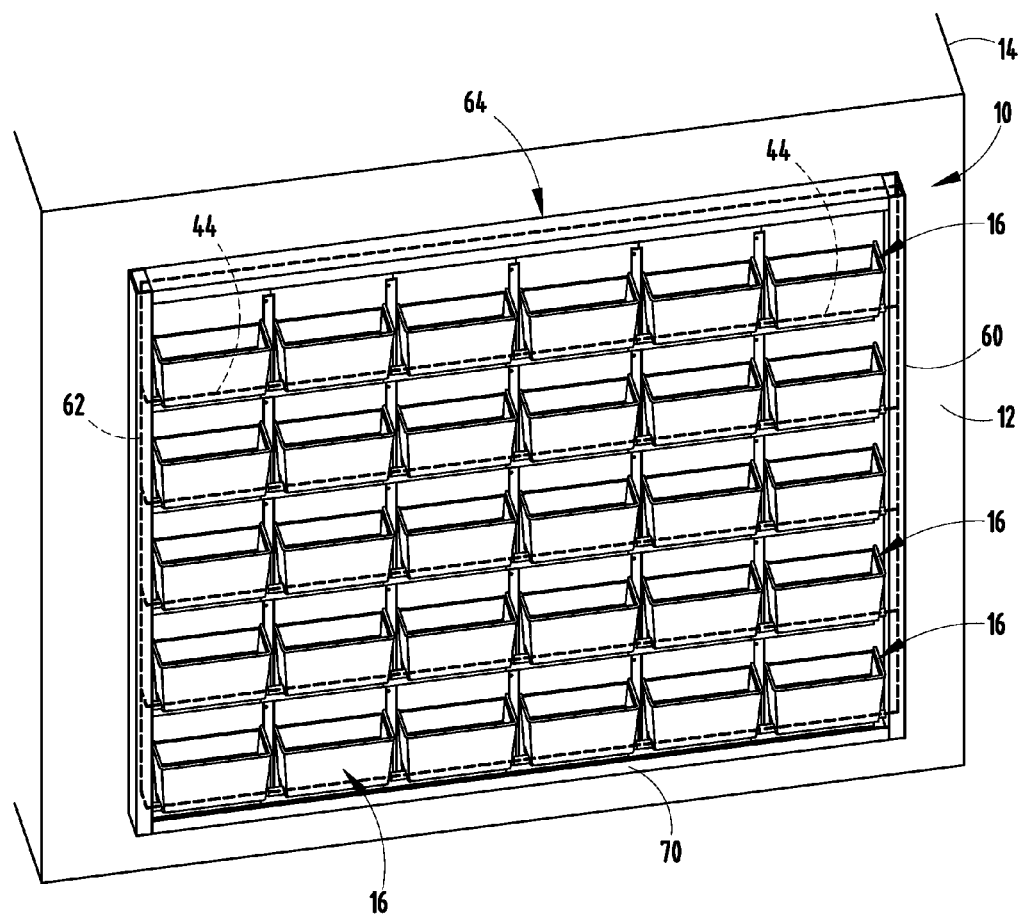
FIG. 1 is a perspective view of a building unit employing the modular wall planting system embodying the present invention.
Figure 2:
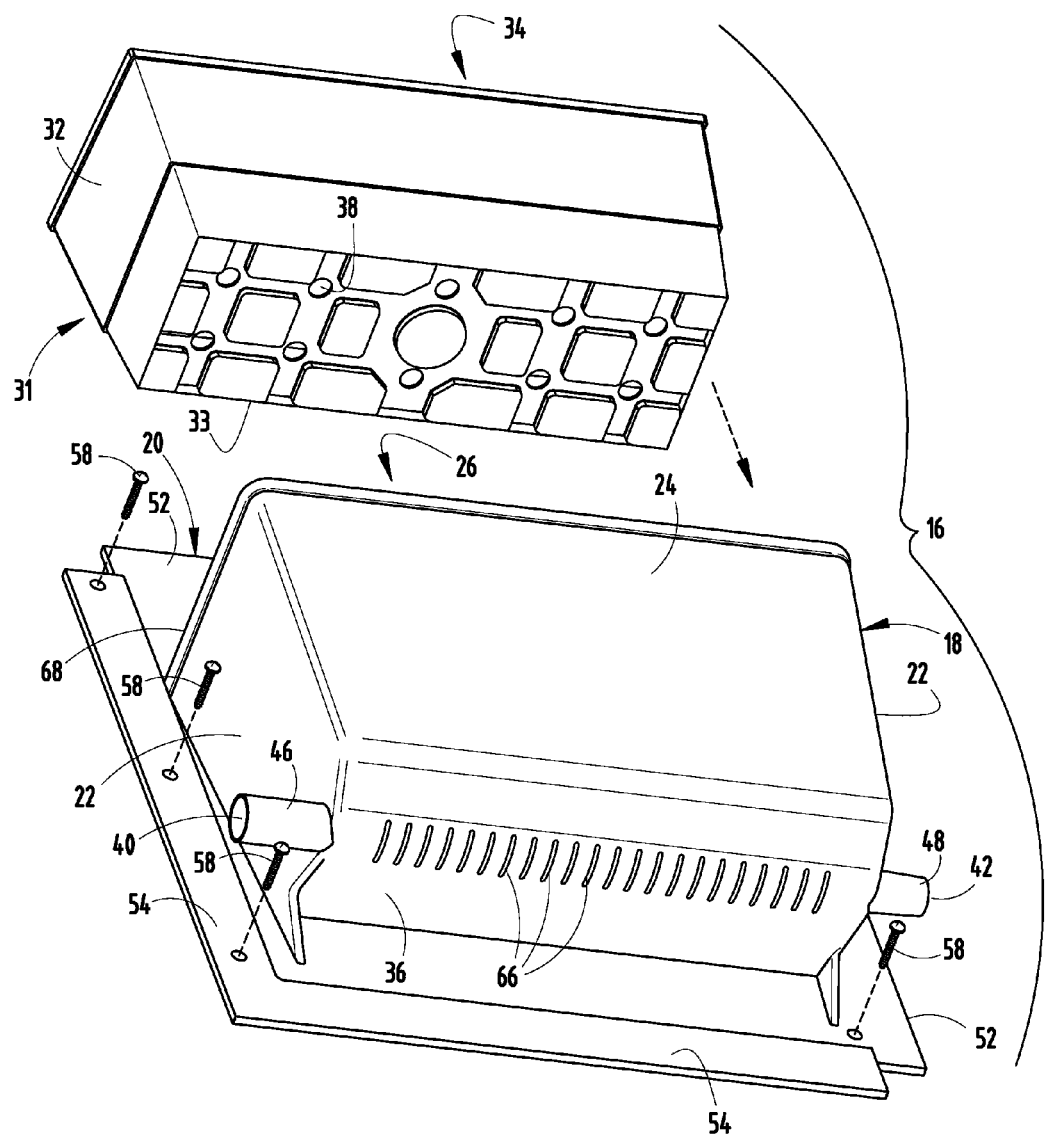
FIG. 2 is an exploded perspective view of a planter unit of the modular wall planting system.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIG. 1) generally designates a modular wall planting system embodying the present invention. In the illustrated example, the modular wall planting system 10 is employed on and secured to a vertical wall surface 12 of a building structure 14, although the wall planting system may be utilized in conjunction with both interior and exterior vertical and substantially vertical wall surfaces. The modular wall planting system 10 comprises a plurality of individual planter units 16 which cooperate to completely cover the surface 12 of the building structure 14.

Figure 3:
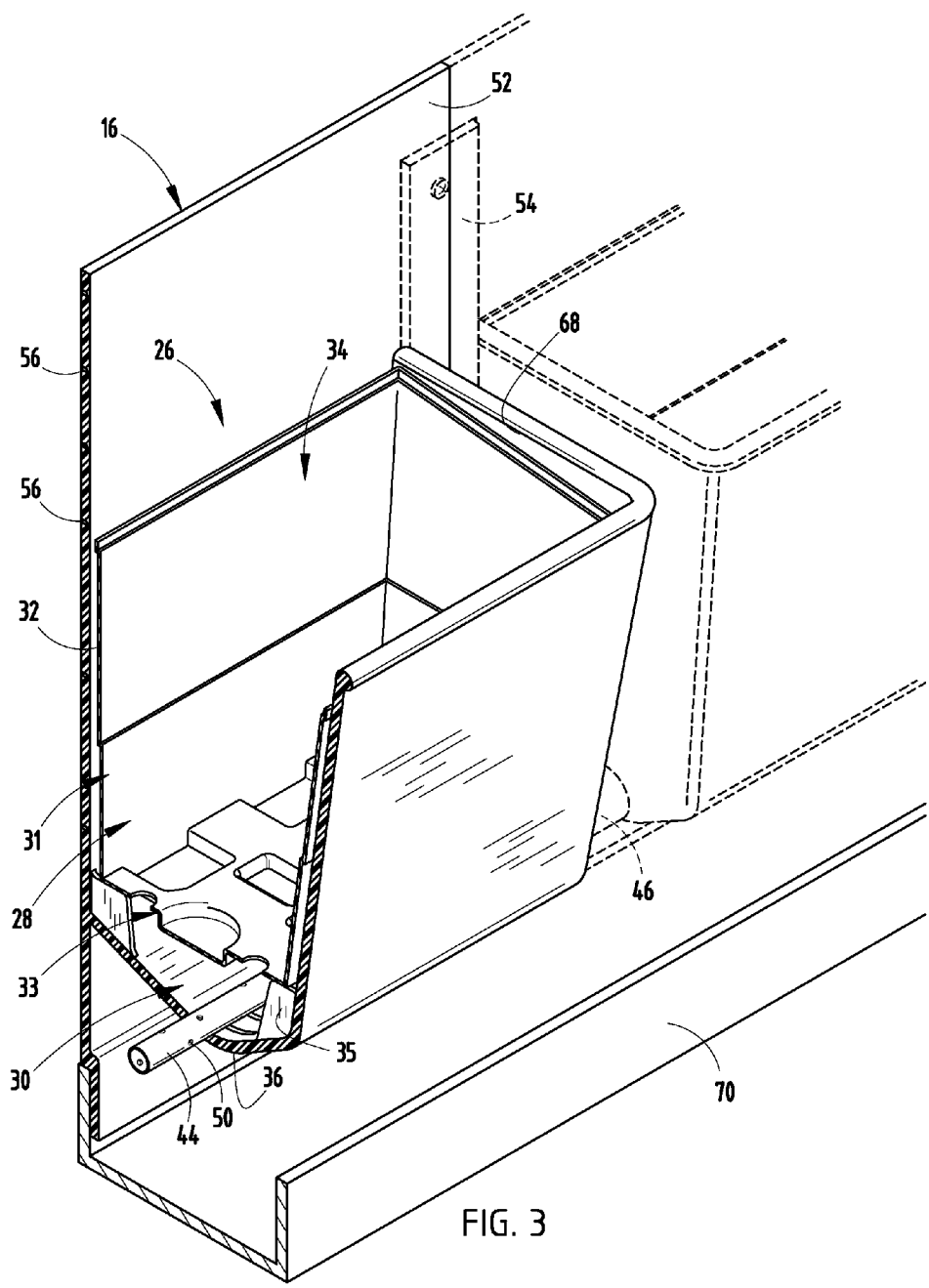
FIG. 3 is a cross-sectional perspective view of the planter unit.
Figure 4:
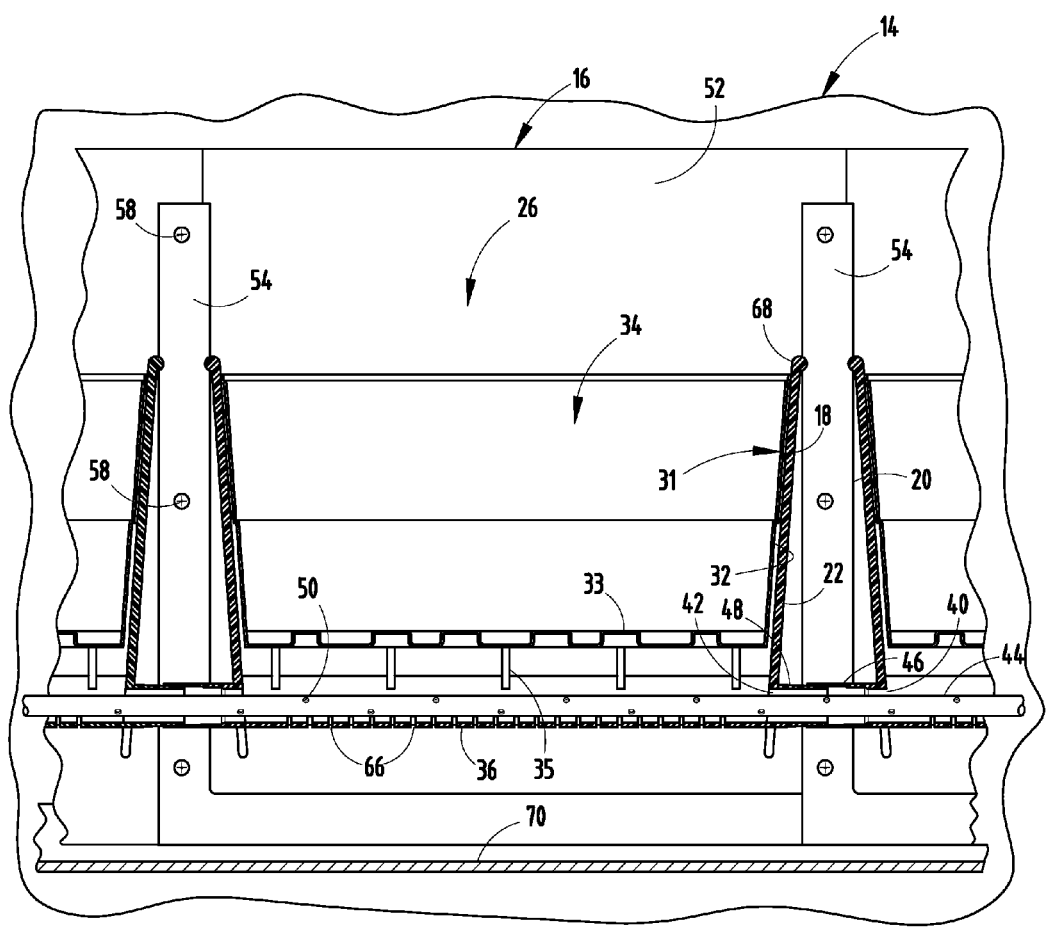
FIG. 4 is an enlarged cross-sectional view of the wall planting system.

As best illustrated in FIGS. 2-4, each planter unit 16 includes a receptacle portion or trough 18 and an integrally-molded mounting portion 20 extending outwardly from the trough 18. In the illustrated example, the planter unit 16 comprises a press-formed plastic, however, other suitable materials may be utilized. The trough 18 includes a plurality of sidewalls including two end walls 22 and a front wall 24 that cooperate to form an interior 26. The interior 26 is divided into a first compartment or section 28 and a second compartment or section 30 by a removable planter insert 31. The insert 31 includes a plurality of sidewalls 32 and a bottom wall 33 that cooperate to form an interior 34. The insert 31 is supported within the trough 18 by a plurality of ribs 35 that extend upwardly from a bottom wall 36 of the trough 18. In the illustrated example, the first section 28 is adapted to receive plant matter therein, such as plantings and aggregate, e.g., dirt, soil, sand, and the like, while the second section 30 is positioned below the first section 28 and is adapted to receive water run-off from the first section 28, wherein the water is received via a plurality of apertures 38 extending through bottom wall 33 of the insert 31 and spaced thereacross. The use of a separate insert 31 allows the plantings and associated aggregate matter to be easily exchanged within the overall system for plant maintenance, replacement for seasonal or aesthetic purposes, and the like.

Each trough 18 includes an input aperture 40 and an output aperture 42 extending into and from the second section 30 of the trough 18, respectively, and allowing passage of a watering line 44 therethrough. In the illustrated example, an input tube 46 and an output tube 48 extend from the associated input aperture 40 and output aperture 42, respectively. The input tube 46 and output tube 48 are sized and adapted so as to telescopingly mate with one another. The watering line 44 extends through the input and output apertures 40, 42 of laterally aligned planter units 16, and includes a plurality of apertures 50 spaced therealong which provide water to the second section 30 of each planter unit 16 as described below.

Figure 5:
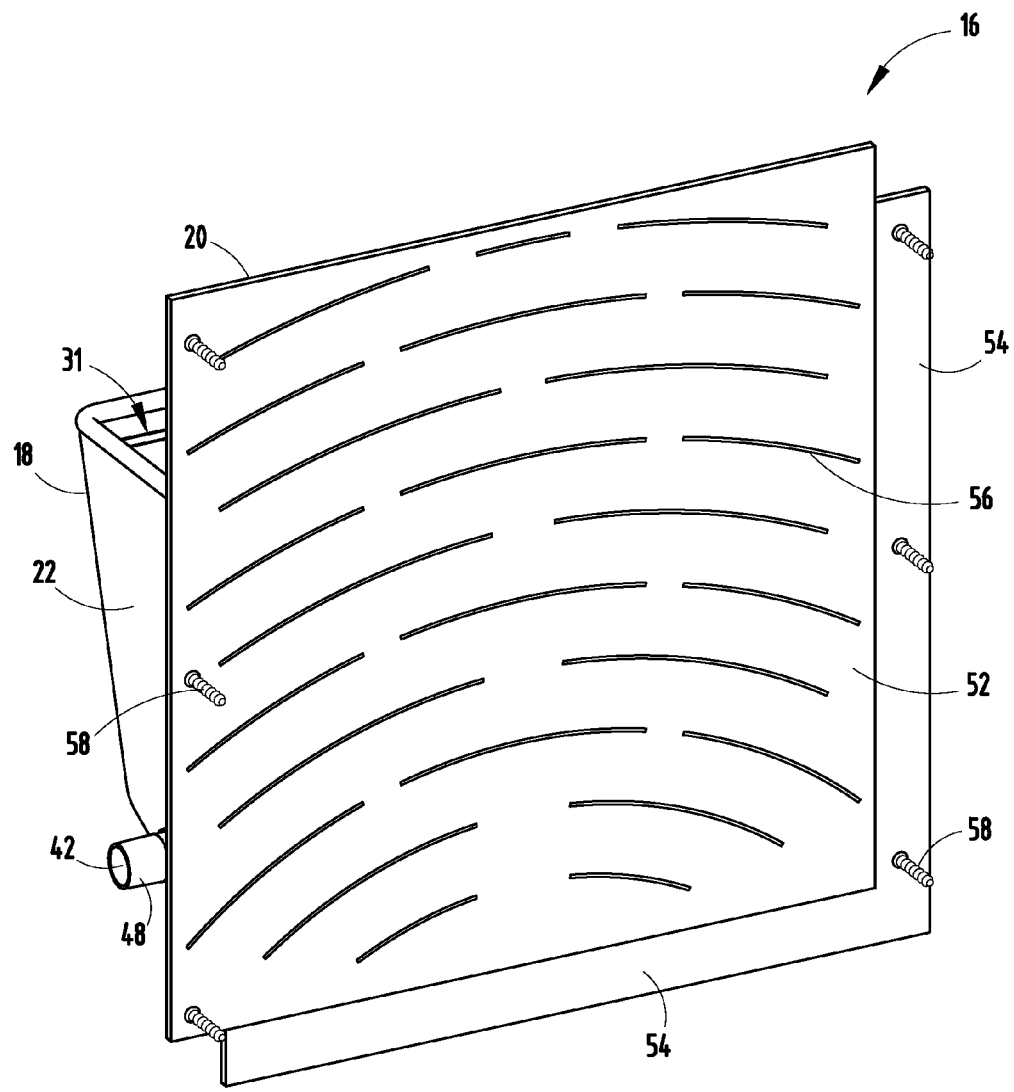
FIG. 5 is a rear perspective view of the planter unit.

The mounting portion 20 is provided a substantially planter, square-shaped overall configuration and includes bottom flanges 52 extending from two of the side edges thereof, and a pair of top flanges 54 extending from side edges opposite the bottom flanges 52. As best illustrated in FIG. 5, the mounting portion 20 is reinforced via a plurality of ribs 56 across a rear surface thereof. The ribs 56 further function to space the mounting portion 20 away from the associated wall surface 12, thereby allowing airflow therebetween and drying of the wall surface 12.

In assembly, the plurality of planter units 16 are secured to a wall surface 12 via a plurality of mechanical fasteners, such as screws 58. The planter units 16 are secured to the wall surface 12 in an overlapping manner, and specifically such that the top flanges 54 of each planter unit 16 overlaps the bottom flanges 52 of an adjacent planter unit 16, thereby completely covering the outer surface of the associated wall surface 12. The watering line 44 is passed through the input and output apertures 40, 42 of the planter units that are in lateral alignment. Each water line 44 is secured to a water supply line 60 and water return line 62 which may be located within an outer frame 64.

In operation, water is supplied to each of the planter units 16 by supplying water to the water supply line 60 and in turn to each of the watering lines 44. Water is then supplied from the watering lines 44 into the second section 30 of each planter unit 16 by the apertures 50 located within the watering lines 44. The supplied water than exits the interior 26 of each planter unit 16 via a plurality of weep apertures 66 spaced along the bottom wall 36 of the planter unit 16, wherein the water is then received via the top open aperture 68 of the planter unit 16 located at a lower position. In other words, water is supplied via the water lines 44 to the interior of the second section 30, where the water drips from the weep apertures 66 onto the plants located in a lower-positioned planter unit 16. A lowermost frame rail 70 of the frame assembly 64 may be used as a water catch located below the lowermost line of planter units 16, while other excess water and fluid may be returned via the water return line 62.

The present inventive modular wall planting system allows plant matter to be secured to vertical and substantially vertical surfaces of wall structures of freestanding walls and buildings, thereby increasing the aesthetic appearance of the structure as well as improving the thermal efficiency of associated buildings. Further, the wall planting system provides a durable outer surface to the structure to which it is attached, and includes a relatively uncomplicated design that can be installed and maintained by relatively unskilled personnel. The present inventive planting system is efficient to use, capable of a long operating life, and is particularly well adapted for the proposed use.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A planter unit for a modular wall planting system, comprising:
    a mounting portion mounted to a substantially vertical outer surface of a wall structure;
    a receptacle portion extending outwardly from the mounting portion and including a plurality of sidewalls and a bottom wall that cooperate to form a first compartment adapted to receive plant matter therein, the plurality of sidewalls cooperating to form an upwardly opening aperture adapted to allow plant matter to extend therethrough, the receptacle portion further including a divider cooperating with the sidewalls and the bottom wall to define a second compartment positioned substantially below the first compartment, the divider including at least one drain aperture extending therethrough and providing fluid communication between the first compartment and the second compartment, the bottom wall including at least one weep aperture extending therethrough and adapted to allow fluid to flow from the second compartment to an exterior of the receptacle, and wherein the plurality of sidewalls include an input aperture and an output aperture for receiving fluid flow therethrough.

2. The planter unit of claim 1, wherein the mounting portion is substantially planar and extends vertically upwardly and downwardly from the receptacle portion.

3. The planter unit of claim 2, wherein the mounting portion is adapted to at least partially overlap with a mounting portion of an adjacent planter unit.

4. The planter unit of claim 1, wherein the upwardly opening aperture is substantially horizontally disposed.

5. The planter unit of claim 1, wherein the at least one drain aperture of the divider includes a plurality of drain apertures spaced about the divider.

6. The planter unit of claim 1, wherein the divider is separate from the receptacle portion, thereby allowing the divider to be removed from within the receptacle.

7. The planter unit of claim 6, wherein the receptacle includes a plurality of tabs extending from the bottom wall and supporting the divider thereon.

8. The planter unit of claim 1, wherein the at least one weep aperture includes a plurality of apertures spaced along a length of the bottom wall.

9. The planter unit of claim 1, wherein the input aperture and the output aperture are each in communication with the second compartment.

10. The planter unit of claim 1, wherein the receptacle includes an input tube and an output tube each extending outwardly from the receptacle and in fluid communication with the second compartment, and wherein the output tube is adapted to telescopingly mate with the input tube of an adjacently positioned planter unit.

11. A modular wall planting system, comprising:
    at least a pair of planting units, each planting unit comprising:
        a mounting structure mounted to a substantially vertical surface of a wall structure; and
        a trough extending outwardly from the mounting structure and including an upwardly opening aperture, the trough defining an interior compartment divided into a first section and a second section at least partially divided from the first section, wherein the first section is adapted to receive plant matter therein, the second section is adapted to receive fluid drained from the first section, and wherein the trough includes at least one weep aperture adapted to allow water to drain from the interior compartment and the second section to an exterior of the trough; and a fluid line extending into the interior of the trough and adapted to transport a fluid thereto;

wherein the individual planting units are adapted to be secured to a wall structure in at least a partially vertically aligned manner such that a lower planting unit of the pair of planting units receives fluid drained from the interior of a higher planting unit via the at least one weep aperture of the trough.

12. The wall planting system of claim 11, wherein the mounting structure of each planting unit is substantially planar and extends vertically upwardly and downwardly from the receptacle portion.

13. The wall planting system of claim 11, wherein the mounting structure of each planting unit is adapted to at least partially overlap with the mounting structure of an adjacent planter unit.

14. The wall planting system of claim 13, wherein the mounting structures of the planting units are adapted to cooperate to completely conceal a wall structure located between the trough of adjacent planting units.

15. The wall planting system of claim 11, wherein the upwardly opening aperture of each planting unit is substantially horizontally disposed.

16. The wall planting system of claim 11, wherein the second section of each planting unit is divided from the first section by a divider, and wherein the divider includes the at least one drain aperture.

17. The wall planting system of claim 16, wherein the at least one drain aperture of the divider includes a plurality of drain apertures spaced about the divider.

18. The wall planting system of claim 16, wherein the divider is separate from the trough, thereby allowing the divider to be removed from within the trough.

19. The wall planting system of claim 18, wherein the trough of each planting unit includes a plurality of tabs extending from a bottom wall of the trough and supporting the divider thereon.

20. The wall planting system of claim 19, wherein the at least one weep aperture of each planting unit includes a plurality of weep apertures spaced along a length of the trough.

21. The wall planting system of claim 11, wherein the trough of each planting unit includes an input aperture and an output aperture, each in communication with the second section and adapted to receive fluid therethrough.

22. The wall planting system of claim 11, wherein the trough includes an input tube and an output tube each extending outwardly from the trough and in fluid communication with the second section and adapted to receive fluid therethrough.

23. The wall planting system of claim 11, wherein the tough includes an input tube and an output tube each extending outwardly from the trough and in fluid communication with the second section, and wherein the output tube is adapted to telescopingly mate with the input tube of an adjacently positioned planter unit.

* * * * *